United States Patent [19]

Yokoyama et al.

[11] Patent Number: 5,449,717
[45] Date of Patent: Sep. 12, 1995

[54] COATING COMPOSITION

[75] Inventors: Tetsuya Yokoyama; Mitsuhior Fukuda; Akimasa Nakahata; Yasushi Nakao, all of Hiratsuka; Motoshi Yabuta, Hadano, all of Japan

[73] Assignee: Kansai Paint Company, Limited, Amagasaki, Japan

[21] Appl. No.: 42,517

[22] Filed: Apr. 5, 1993

[30] Foreign Application Priority Data

Apr. 8, 1992 [JP] Japan .................. 4-087326

[51] Int. Cl.⁶ .................. C08L 43/04; C08L 61/00
[52] U.S. Cl. .................. 525/160; 524/512
[58] Field of Search ............. 525/101, 160; 524/512

[56] References Cited

U.S. PATENT DOCUMENTS

| | | | |
|---|---|---|---|
| 4,288,357 | 9/1981 | Kanazawa et al. | 524/270 |
| 4,980,409 | 12/1990 | Harakawa et al. | 524/510 |
| 5,063,114 | 11/1991 | Nambu | 428/447 |
| 5,087,286 | 2/1992 | Fukada et al. | 525/101 |
| 5,100,962 | 3/1992 | Sawada et al. | 525/125 |

FOREIGN PATENT DOCUMENTS 4-318088  11/1992  Japan .
1171012  11/1969  United Kingdom .

*Primary Examiner*—Ralph H. Dean
*Attorney, Agent, or Firm*—Armstrong, Westerman, Hattori, McLeland & Naughton

[57] ABSTRACT

A coating composition which consists essentially of:
(A) a copolymer comprising 5 to 40 wt. % of an alkoxysilane-containing vinyl monomer which is a compound represented by the formula

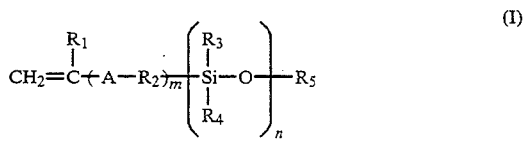

(I)

wherein A is

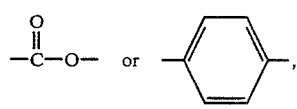

$R_1$ is a hydrogen atom or methyl group, $R_2$ is a bivalent aliphatic saturated hydrocarbon group having 1 to 6 carbon atoms, $R_3$ and $R_4$ are the same or different and are each a phenyl group, alkyl group having 1 to 6 carbon atoms or alkoxy group having 1 to 10 carbon atoms, $R_5$ is an alkyl group having 1 to 10 carbon atoms, m is 0 or 1, and n is an integer of 1 to 100, 5 to 50 wt. % of a hydroxyl-containing vinyl monomer and 30 to 70 wt. % of a fluorine-containing vinyl monomer, and (B) an amino resin in an amount of 5 to 50 wt. % based on the total amount of solids in the copolymer (A) and the amino resin (B).

8 Claims, No Drawings

COATING COMPOSITION

The present invention relates to novel coating compositions which are capable of forming coatings excellent especially in acid resistance, scratch resistance and water repellency (water repellency retentivity) and which are well-suited as automotive top coating compositions.

The important properties of automotive top coating compositions of course include capability of forming coatings with a finished appearance which is outstanding in surface smoothness, gloss, distinctness-of-image gloss, etc., and further include ability to form coatings which are also excellent in acid resistance, scratch resistance, water repellency (retentivity), etc. which are of increased importance in recent years. Among the automotive top coating compositions presently used are those primarily comprising an acrylic copolymer containing an alkoxysilane group and capable of forming coatings having excellent acid resistance, whereas the coating becomes impaired in water repellency with time due to deterioration of the surface layer. Although coatings of high water repellency can be prepared from coating compositions consisting essentially of an amino resin and an acrylic copolymer containing a fluorine-containing vinyl monomer, but these compositions have the drawback of being inferior in acid resistance to the coating composition primarily comprising an alkoxysilane-containing acrylic copolymer. In view of these situations, it is recently strongly desired to develop top coating compositions for forming coatings which are excellent in acid resistance, scratch resistance, water repellency (water repellency retentivity), etc.

An object of the present invention is to provide a novel coating composition for forming coatings which are excellent in acid resistance, scratch resistance and water repellency (water repellency retentivity) and which are nevertheless satisfactory in other properties such as finished appearance and weatherability.

Other objects and features of the present invention will become apparent from the following description.

The present invention provides a coating composition characterized in that the composition consists essentially of:

(A) a copolymer comprising 5 to 40 wt. % of an alkoxysilane-containing vinyl monomer which is a compound represented by the formula

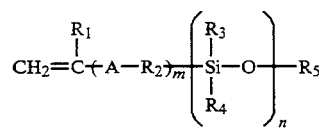

wherein A is

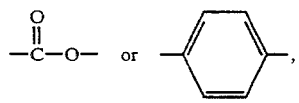

$R_1$ is a hydrogen atom or methyl group, $R_2$ is a bivalent aliphatic saturated hydrocarbon group having 1 to 6 carbon atoms, $R_3$ and $R_4$ are the same or different and are each a phenyl group, alkyl group having 1 to 6 carbon atoms or alkoxy group having 1 to 10 carbon atoms, $R_5$ is an alkyl group having 1 to 10 carbon atoms, m is 0 or 1, and n is an integer of 1 to 100, 5 to 50 wt. % of a hydroxyl-containing vinyl monomer and 30 to 70 wt. % of a fluorine-containing vinyl monomer, and (B) an amino resin in an amount of 5 to 50 wt. % based on the total amount of solids in the copolymer (A) and the amino resin (B).

In view of the foregoing situations of the prior art, we have conducted intensive research and found that the use of the copolymer comprising the above-specified alkoxysilane-containing vinyl monomer, hydroxyl-containing vinyl monomer and fluorine-containing vinyl monomer provides coatings which are excellent in acid resistance, scratch resistance and water repellency (retentivity).

The present invention has been accomplished based on this novel finding.

The coating composition of the invention forms coatings which are excellent in acid resistance, scratch resistance and water repellency (water repellency retentivity) because the above-specified copolymer (A) is used as the base resin for curing the amino resin.

More specifically, the coating formed by the present composition contains —Si—O—Si— linkages formed by a crosslinking reaction between alkoxysilane groups introduced into the copolymer from the alkoxysilane-containing vinyl monomer, and —Si—O—C— linkages formed by a crosslinking reaction between such alkoxysilane groups and hydroxyl groups introduced form the hydroxyl-containing vinyl monomers, and therefore has high resistance to hydrolysis in the presence of acids or the like. Moreover, these linkages and fluorine atoms introduced into the copolymer from the fluorine-containing vinyl monomer presumably give low surface energy to the coating which therefore exhibits high water repellency and excellent scratch resistance.

The coating composition of the present invention will be described below in greater detail.

Copolymer (A)

The copolymer (A) comprises 5 to 40 wt. % of a compound represented by the formula (I), i.e., an alkoxysilane-containing vinyl monomer, 5 to 50 wt. % of a hydroxyl-containing vinyl monomer, 30 to 70 wt. % of a fluorine-containing vinyl monomer and, when required, 0 to 60 wt. % of other copolymerizable vinyl monomer.

In the compound of the formula (I) which is one of the essential monomers of the copolymer, n is preferably 1 to 10.

Examples of the bivalent aliphatic saturated hydrocarbon group of 1 to 6 carbon atoms represented by $R_2$ in the formula (I) are straight- or branched-chain alkylene groups such as methylene, ethylene, propylene, 1,2-butylene, 1,3-butylene, 2,3-butylene, tetramethylene, ethylmethylene, pentamethylene, hexamethylene, etc. Examples of the alkyl group of 1 to 6 carbon atoms represented by $R_3$ and $R_4$ are straight- or branched-chain alkyl groups such as methyl, ethyl, n-propyl, isopropyl, n-butyl, isobutyl, sec-butyl, tert-butyl, n-pentyl, isopentyl, neopentyl, n-hexyl, isohexyl, etc. Examples of the alkyl group of 1 to 10 carbon atoms represented by $R_5$ include not only such groups but n-heptyl, 1-methylpentyl, 2-methylhexyl, n-octyl, n-nonyl, n-decyl, etc. Examples of the alkoxy group of 1 to 10 carbon atoms represented by $R_3$ and $R_4$ are straight- or branched-chain alkoxy groups such as methoxy, ethoxy, n-propoxy, isopropoxy, n-butoxy, isobutoxy, secbutoxy, tert-butoxy, n-pentoxy, isopentoxy, n-hexyloxy, isohexyloxy, n-octyloxy, etc. When n is 2 or more, the R₃ groups or R₄ groups may be the same or different.

Of the compounds of the formula (I) for use in the invention, those wherein m is 0 are, for example, trimethoxyvinylsilane, triethoxyvinylsilane, etc.

Of the compounds of the formula (I) for use in the invention, those wherein m is 1 and A is γ-(meth)acryloxypropylmethyldimethoxysilane,
γ-(meth)acryloxypropylmethyldiethoxysilane,
γ-(meth)acryloxypropylmethyldipropoxysilane,
γ-(meth)acryloxybutylphenyldimethoxysilane,
γ-(meth)acryloxybutylphenyldiethoxysilane,
γ-(meth)acryloxybutylphenyldipropoxysilane,
γ-(meth)acryloxypropyldimethylmethoxysilane,
γ-(meth)acryloxypropyldimethylethoxysilane,
γ-(meth)acryloxypropylphenylmethylmethoxysilane,
γ-(meth)acryloxypropylphenylmethylethoxysilane,

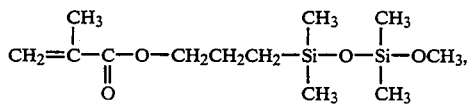

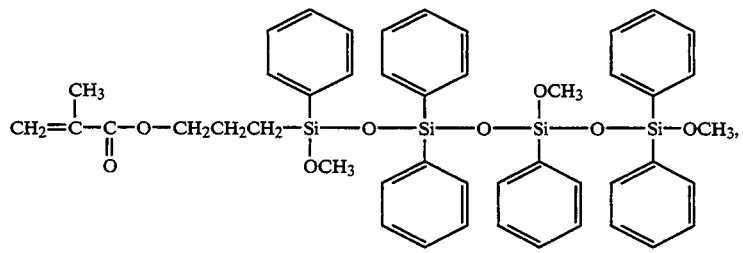

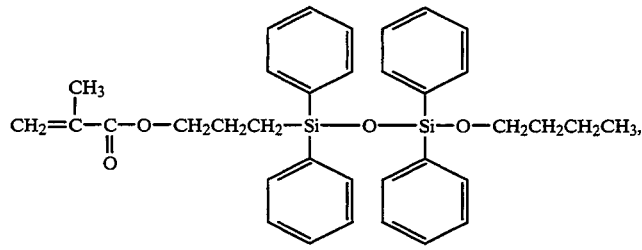

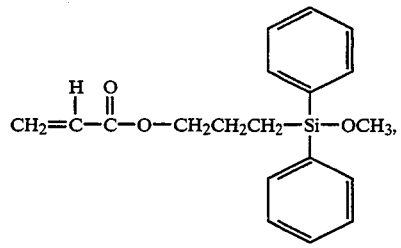

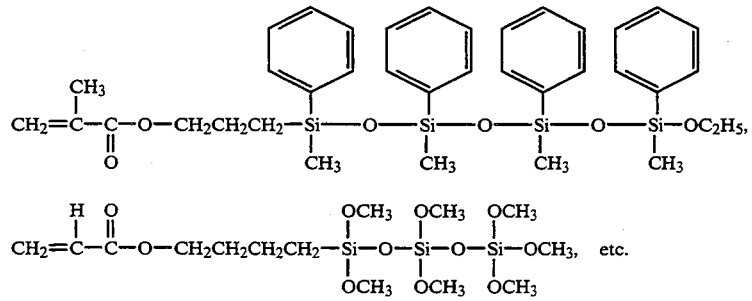

are, for example,
γ-(meth)acryloxyethyltrimethoxysilane,
γ-(meth)acryloxypropyltrimethoxysilane,
γ-(meth)acryloxypropyltriethoxysilane,
γ-(meth)acryloxypropyltripropoxysilane, Of the compounds of the formula (I), those wherein m is 1 and A is are, for example,

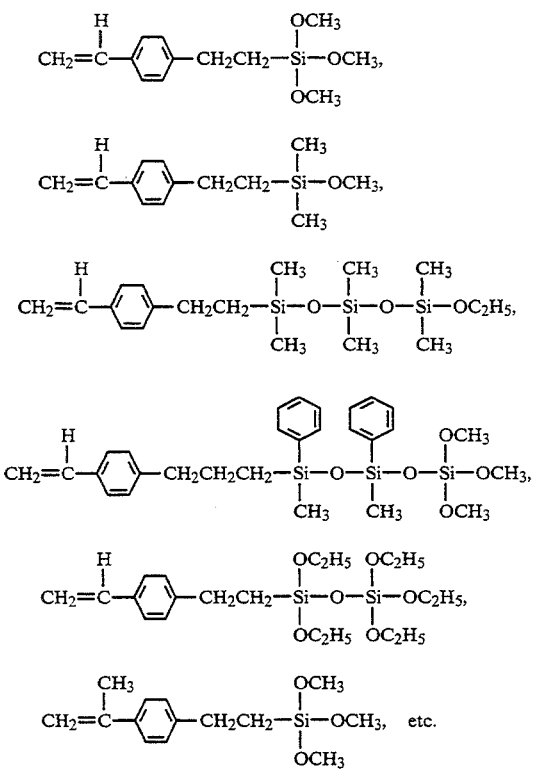

Of the compounds of the formula (I), preferred are trimethoxyvinylsilane, acryloxypropyltrimethoxysilane, methacryloxypropyltriethoxysilane, methacryloxypropyltri-n-butoxysilane, acryloxypropylmethyldimethoxysilane, methacryloxypropylmethyldimethoxysilane, methacryloxypropylmethyl-di-n-butoxysilane, etc.

Examples of useful hydroxyl-containing vinyl monomers are 2-hydroxyethyl (meth)acrylate, hydroxypropyl (meth)acrylate, butanediol monoacrylate, "PLACCEL FM-1", "PLACCEL FM-2", "PLACCEL FM-3", "PLACCEL FA-1", PLACCEL FA-2" and "PLACCEL FA-3" (trademarks, caprolactone-modified 2-hydroxyethyl (meth)acrylates manufactured by Daicel Chemical Industries, Ltd.), hydroxyethyl vinyl ether, hydroxybutyl vinyl ether, ethylene glycol monoallyl ether, diethylene glycol monoallyl ether, hydroxybutyl ally ether, etc. although these examples are not limitative.

The fluorine-containing vinyl monomer which is another essential component of the copolymer is a compound represented by the following formula (II) or (III). Formula (II):

$$CX_2=CX_2$$

wherein Xs are the same or different and are each H, Cl, Br, F, alkyl group or haloalkyl group, and at least one fluorine atom is present.

Formula (III):

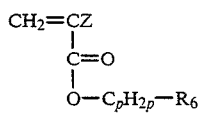

wherein Z is a hydrogen atom or methyl group, $R_6$ is a fluoroalkyl group, and p is an integer of 1 to 10.

The "alkyl group" in the formula (II) is a group having 1 to 6, preferably 1 to 4, carbon atoms. Examples of such groups are methyl, ethyl, propyl, isopropyl, butyl and pentyl. The "haloalkyl group" is one having 1 to 6, preferably 1 to 4, carbon atoms. Examples of such groups are $CHF_2$, $CH_2F$, $CCl_3$, $CHCl_2$, $CH_2Cl$, $CFCl_2$, $(CF_2)_2CF_3$, $(CF_2)_3CF_3$, $CF_2CH_3$, $CF_2CHF_2$, $CF_2Br$, $CH_2Br$, $CF_3$, etc.

The monomers represented by the formula (II) include, for example,
$CF_2=CF_2$, $CHF=CF_2$, $CH_2=CF_2$, $CH_2=CHF$, $CClF=CF_2$, $CHCl=CF_2$, $CCl_2=CF_2$, $CClF=CClF$, $CHF=CCl_2$, $CH_2=CClF$, $CCl_2=CClF$, $CF_3CF=CF_2$, $CF_3CF=CHF$, $CF_3CH=CF_2$, $CF_3CF=CH_2$, $CH_3CF=CF_2$, $CHF_2CF=CHF$, $CH_3CF=CH_2$, $CF_2ClCF=CF_2$, $CF_3CCl=CF_2$, $CF_3CF=CFCl$, $CF_2ClCCl=CF_2$, $CF_2ClCF=CFCl$, $CFCl_2CF=CF_2$, $CF_3CCl=CClF$, $CF_3CCl=CCl_2$, $CClF_2CF=CCl_2$, $CCl_3CF=CF_2$, $CF_2ClCCl=CCl_2$, $CFCl_2CCl=CCl_2$, $CF_3CF=CHCl$, $CClF_2CF=CHCl$, $CF_3CCl=CHCl$, $CHF_2CCl=CCl_2$, $CF_2ClCH=CCl_2$, $CF_2ClCCl=CHCl$, $CCl_3CF=CHCl$, $CF_2ClCF=CF_2$, $CF_2BrCH=CF_2$, $CF_3CBr=CHBr$, $CF_2ClCBr=CH_2$, $CH_2BrCF=CCl_2$, $CF_3CBr=CH_2$, $CF_3CH=CHBr$, $CF_2BrCH=CHF$, $CF_2BrCF=CF_2$, $CF_3CF_2CF=CF_2$, $CF_3CF=CFCF_3$, $CF_3CH=CFCF_3$, $CF_2=CFCF_2CHF_2$, $CF_3CF_2CF=CH_2$, $CF_3CH=CHCF_3$, $CF_2=CFCF_2CH_3$, $CF_2=CFCH_2CH_3$, $CF_3CH_2CH=CH_2$, $CF_3CH=CHCH_3$, $CF_2=CHCH_2CH_3$, $CH_3CF_2CH=CH_2$, $CFH_2CH=CHCFH_2$, $CH_3CF_2CH=CH_2$, $CH_2=CFCH_2CH_3$, $CF_3(CF_2)_2CF=CF_2$, $CF_3(CF_2)_3CF=CF_2$, etc.

The "fluoroalkyl group" in the formula (III) is one having 3 to 21 carbon atoms. Examples of such groups are $C_4F_9$, $(CF_2)_6CF(CF_3)_2$, $C_8F_{17}$, $C_{10}F_{21}$, etc.

The monomers represented by the formula (II) include, for example,

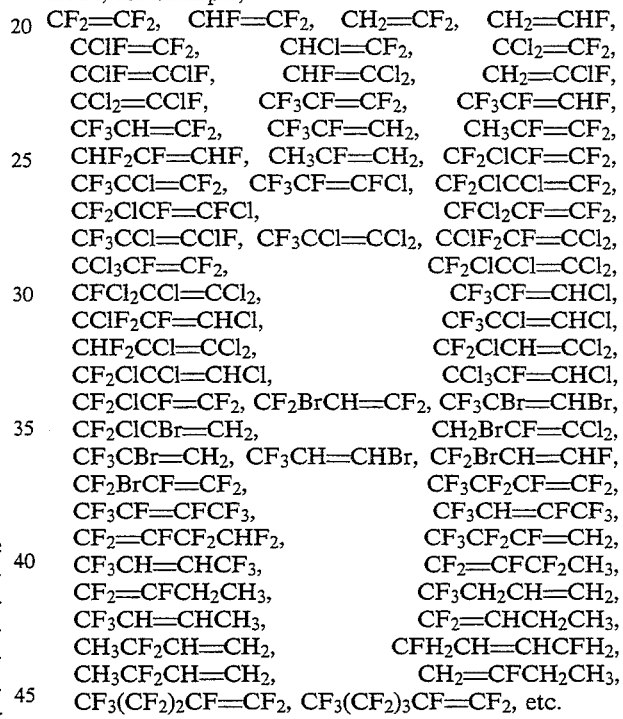

One of these monomers, or a combination of at least two of them can be used.

Use of the monomer represented by the formula (II) provides coatings which are excellent especially in acid resistance and weatherability, while use of the monomer of the formula (III) affords coatings which are outstanding in water repellency.

Examples of other vinyl monomers copolymerizable with the alkoxysilane-containing vinyl monomer, hydroxyl-containing vinyl monomer and fluorine-containing vinyl monomer are compounds which have one polymerizable unsaturated linkage per molecule and which include esters of (meth)acrylic acids with monohydric alcohols of 1 to 22 carbon atoms, such as methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, lauryl acrylate, lauryl methacrylate, stearyl acrylate, stearyl methacrylate and the like; carboxyl-containing vinyl monomers such as acrylic acid, methacrylic acid, maleic anhydride and the like; glycidyl-containing vinyl monomers such as glycidyl acrylate, glycidyl methacrylate and the like; amide-type vinyl monomers such as acrylamide, methacrylamide, N-methylolacrylamide, N-methylolmethacrylamide and the like; aromatic compounds such as styrene, α-methylstyrene and vinyltoluene; acrylonitrile compounds such as acrylonitrile and methacrylonitrile; olefin compounds such as ethylene, propylene, butylene and isoprene; alkyl vinyl ethers such as ethyl vinyl ether, propyl vinyl ether, butyl vinyl ether, pentyl vinyl ether and hexyl vinyl ether; cycloalkyl vinyl ethers such as cyclopentyl vinyl ether and cyclohexyl vinyl ether; aryl vinyl ethers such as phenyl vinyl ether; aralkyl vinyl ethers such as benzyl vinyl ether and phenethyl vinyl ether; vinyl esters such as vinyl acetate, vinyl lactate and vinyl butyrate; propenyl esters such as isopropenyl acetate and isopropenyl propionate; etc.

The amount of the alkoxysilane-containing vinyl monomer to be copolymerized is 5 to 40 wt. %, preferably 5 to 30 wt. %. If the amount is less than 5 wt. %, a reduced acid resistance will result, whereas amounts exceeding 40 wt. % entail the problem, for example, of impairing the storage stability of the resulting coating composition. The amount of the hydroxyl-containing vinyl monomer to be copolymerized is 5 to 50 wt. %, preferable 10 to 40 wt. %. Amounts less than 5 wt. % result in a reduced crosslinking density, impaired curability and lower acid resistance, whereas amounts in excess of 50 wt. % entail problems such as impaired water resistance.

The amount of the fluorine-containing vinyl monomer to be copolymerized is 30 to 70 wt. %, preferably 10 to 50 wt. %. Amounts less than 10 wt. %, lead to reduced water repellency (water repellency retentivity), while amounts exceeding 50 wt. % entail problems such as a lower acid resistance.

Other vinyl monomer which is copolymerized with these essential monomers when so required can be used in an amount of 0 to 60 wt. %.

The alkoxysilane-containing vinyl monomer, hydroxyl-containing vinyl monomer, fluorine-containing vinyl monomer and other vinyl monomer can be copolymerized in the same manner as in preparing usual acrylic resins, vinyl resins or the like, for example, by dissolving or dispersing the monomers in an organic solvent, and heating the solution or dispersion at a temperature of about 60 to about 180° C. with stirring in the presence of a radical polymerization initiator. The reaction is conducted usually for about 1 to about 10 hours.

Useful organic solvents are hydrocarbon solvents such as heptane, toluene, xylene, octane, mineral spirit and the like; ester solvents such as ethyl acetate, n-butyl acetate, isobutyl acetate, methyl cellosolve acetate, butylcarbitol acetate and the like; ketone solvents such as methyl ethyl ketone, methyl isobutyl ketone, diisobutyl ketone and the like; alcohol solvents such as ethanol, isopropanol, n-butanol, sec-butanol, isobutanol and the like; and ether solvents such as n-butyl ether, dioxane, ethylene glycol monomethyl ether, ethylene glycol monoethyl ether and the like. Of these solvents, the hydrocarbon solvent, when to be used, is used preferably in mixture with other solvents to increase the dissolving power.

Useful radical polymerization initiators can be any of those conventionally used such as benzoyl peroxide, tert-butylperoxy-2-ethylhexanoate and like peroxides, azoisobutyronitrile, azobisdimethylvaleronitrile and like azo compounds.

Generally, the copolymer (A) has a number average molecular weight of about 3,000 to about 500,000, preferably about 5,000 to about 100,000.

The copolymer for use as the component (A) in the present invention is prepared by copolymerizing the alkoxysilane-containing vinyl monomer which is a compound of the formula (I), hydroxyl-containing vinyl monomer, fluorine-containing vinyl monomer and other vinyl monomer as described above. The copolymer has an alkoxysilane group and hydroxyl group attached thereto as a side chain, and a fluorine atom attached to its main chain or a side chain. Thus, unlike acrylic resins serving as the base resin of conventional amino resin curing systems, the copolymer has the alkoxysilane group which is capable of introducing into the site of crosslinking —SiOSi— or —SiOC— which is a chemical linkage not susceptible to hydrolysis, and further has a fluorine atom which is excellent in water repellency (retentivity). In the case where the copolymer is used as the base resin of amino resin curing systems, therefore, the copolymer enables the system to form coatings which, when cured, exhibit outstanding surface characteristics (acid resistance, water repellency, resistance to scratches, water, chemicals, weather and heat), especially high acid resistance and excellent water repellency (water repellency retentivity).

According to the present invention, the copolymer (A) may be used in combination with an acrylic polyol, polyester polyol or like hydroxyl-containing resin and/or other alkoxysilane-containing resin.

Amino resin (B)

Amino resins useful in the invention include conventional partially or completely methylolated amino resins produced by the reaction of an aldehyde and an amino component such as melamine, urea, benzoguanamine, acetoguanamine, steroguanamine, spiroguanamine, dicyandiamide or the like. Useful aldehydes include formaldehyde, paraformaldehyde, acetaldehyde, benzaldehyde, etc. Also usable are these methylolated amino resins etherified with a suitable alcohol. Alcohols useful for etherification are methyl alcohol, ethyl alcohol, n-propyl alcohol, isopropyl alcohol, n-butyl alcohol, isobutyl alcohol, 2-ethylbutanol, 2-ethylhexanol, etc. The amino resin to be used in the invention is preferably a melamine resin, more preferably hexamethoxymethylmelamine or an etherified melamine resin prepared from this melamine by substituting an alcohol with at least four carbon atoms for some or all of the methoxy groups thereof.

Usable as the component (B) in the present invention are those commercially available under Cymel 303 (trademark, fully methoxylated melamine resin manufactured by Mitsui-Cyanamid, Ltd.), U-VAN 20SE-60 (trademark, butylated melamine resin manufactured by Mitsui Toatsu Chemicals Inc.), etc.

The coating composition of the invention comprises the components (A) and (B) as the main components. The mixing ratio of these components is optionally selected according to the contemplated object. Based on the total solids content of the components (A) and (B), the amount of the component (A) to be used is 50 to 95 wt. %, preferably 55 to 90 wt. %, more preferably 60 to 80 wt. %, and the amount of the component (B) is 5 to 50 wt. %, preferably 10 to 45 wt. %, more preferably about 20 to about 40 wt. %. If the amount of component (B) is less than 5 wt. %, seriously impaired resistance to water and weather will result, whereas amounts over 50 wt. % entail problems such as greatly impaired mechanical properties, and seriously impaired interlaminar adhesion in layered coatings.

The coating composition of the invention is used usually in the form of an organic solvent solution. For example, solutions of the resins to be used are merely mixed together, whereby a solvent-type composition can be obtained readily.

Preferably, the coating composition of the present invention may have incorporated therein a curing catalyst when so required. Examples of such catalysts are acidic compounds such as p-toluenesulfonic acid, dodecylbenzenesulfonic acid, trichloroacetic acid, phosphoric acid, mono-n-propylphosphoric acid, monoisopropylphosphoric acid, mono-n-butylphosphoric acid, monoisobutylphosphoric acid, mono-tert-butylphosphoric acid, monooctylphosphoric acid, monodecylphosphoric acid and like monoalkylphosphoric acid, di-n-propylphosphoric acid, diisopropylphosphoric acid, di-n-butylphosphoric acid, diisobutylphosphoric acid, di-tert-butylphosphoric acid, dioctylphosphoric acid, didecylphosphoric acid and like dialkylphosphoric acid, phosphoric acid ester of β-hydroxy-ethyl acrylate or methacrylate, mono-n-propylphosphorus acid, monoisopropylphosphorus acid, mono-n-butylphosphorus acid, monoisobutylphosphorus acid, mono-tert-butylphosphorus acid, monooctylphosphorus acid, monodecylphosphorus acid and like monoalkylphosphorus acid, di-n-propylphosphorus acid, diisopropylphosphorus acid, di-n-butylphosphorus acid, diisobutylphosphorus acid, di-tert-butylphosphorus acid, dioctylphosphorus acid, didecylphosphorus acid and like dialkylphosphorus acid, etc.; tin-containing compounds such as tetraisopropyl titanate, tetrabutyl titanate, tin octylate, dibutyltin diacetate, dibutyltin dioctate, dibutyltin dilaurate, dibutyltin dimaleate, etc.; basic compounds such as butylamine, tert-butylamine, dibutylamine, hexylamine, ethylenediamine, triethylamine, isophoronediamine, imidazole, lithium hydroxide, sodium hydroxyide, potassium hydroxike, sodium methylate, etc. At least one of these catalysts is used.

When hexamethoxymethylmelamine or an etherified melamine resin which is obtained by partially or wholly substituting the methoxy group of hexamethoxymethylmelamine with an alcohol having four or more carbon atoms is used for the amino resin as the component (B), paratoluenesulfonic acid, dodecylbenzenesulfonic acid or like strong acid catalyst is preferably used as the curing catalyst for the hydroxyl group. Further, such strong acid catalyst, when neutralized (blocked) with triethylamine, diethanolamine, 2-amino-2-methylpropanol or like amine compound, can be used while giving storage stability to the resulting coating composition of the one-pack type. It is of interest that in this case, the neutralized (blocked) strong acid catalyst serves also as a curing catalyst for the alkoxysilane group. In brief, at a baking temperature of 100° C. or higher, the neutralized (blocked) strong acid catalyst serves as a catalyst both for the reaction of the resin and for the reaction of the alkoxysilane. It is further interesting that since this neutralized (blocked) strong acid catalyst does not serve as a curing catalyst for alkoxysilane at ordinary temperatures, the coating composition of the one-pack type can be stored under an unsealed condition, although this is generally considered impossible with curing systems of alkoxysilanes.

When required, the coating composition of the present invention is usable, for example, as a clear coating composition, solid color coating composition, metallic coating composition or the like, with various known additives incorporated therein.

The coating composition of the invention may have incorporated therein organic and/or inorganic thixotropic agents; organic ultrafine particles prepared as by the non-aqueous polymer dispersion or emulsion polymerization process; silicon-base or like surface conditioning agents; ultraviolet absorbers; photostabilizers; etc.

The solvent to be used in the present coating composition is any of those for use in conventional acrylic resin/melamine resin coating compositions, such as toluene, xylene, methyl ethyl ketone, ethyl acetate, dioxane, butanol and like organic solvents and water. These solvents can be used singly or in the form of a suitable mixture.

The coating composition of the invention can be applied, for example, by electrostatic coating or air spray coating using a conventional coating machine, apparatus or the like as it is. The viscosity of the composition is suitably determined in accordance with the coating machine, kind of solvent, coating conditions, etc.

The coating composition of the invention forms coatings which are excellent in acid resistance, water repellency, resistance to scratching, staining, water and weather, etc., retain these properties over a prolonged period of time and yet exhibit a satisfactory appearance. The present coating composition is therefore well-suited as an automotive top coating composition.

The present invention will be described in greater detail with reference to the following preparation examples, examples and comparative examples, in which the parts and percentages are all by weight.

PREPARATION EXAMPLE 1

Preparation of Copolymer (A-1)

The following monomers were placed into a 400-ml stainless steel autoclave equipped with a stirrer.

| | |
|---|---|
| Hydroxybutyl allyl ether | 25 parts |
| Trimethoxyvinylsilane | 10 parts |
| Vinyl butyrate | 15 parts |

Also charged in were the compounds given below.

| Methyl isobutyl ketone | 200 parts |
|---|---|
| Azobisisobutyronitrile | 2 parts |
| Sodium borate | 0.5 part |

After removing air from the interior of the autoclave by replacement by nitrogen and cooling the charge to a solid state, 50 parts of $CF_2=CFCl$ was introduced into the autoclave, and the internal temperature of the autoclave was gradually raised to 60° C., followed by a continued reaction for at least to 16 hours with stirring. Upon the internal pressure of the autoclave dropping to not higher than 1 kg/cm$^2$, the autoclave was cooled with water to discontinue the reaction. The resulting resin solution was placed into an excess of heptane to separate out a resin, followed by washing and drying to obtain 82 parts of resin in a yield of 82%. The resin was 5,800 in number average molecular weight as determined by GPC. The resin (A-1) obtained was dissolved in the same amount of xylene to obtain a resin solution having a nonvolatile content of 50%.

PREPARATION EXAMPLE 2

Preparation of Copolymer (A-2)

The following compounds were placed into a 400-ml stainless steel autoclave equipped with a stirrer.

| Hydroxybutyl vinyl ether | 15 parts |
|---|---|
| Trimethoxyvinylsilane | 30 parts |
| Cyclohexyl vinyl ether | 10 parts |
| Ethyl vinyl ether | 5 parts |

After removing air from the interior of the autoclave by replacement by nitrogen and cooling the charge to a solid state, 40 parts of $CF_2=CF_2$ was introduced into the autoclave, followed by the same procedure as in Preparation Example 1 to obtain a solution of resin (A-2) having a nonvolatile content of 50%.

PREPARATION EXAMPLE 3

Preparation of Copolymer (A-3)

The following compounds were charged into a 400-ml stainless steel autoclave equipped with a stirrer.

| Hydroxybutyl allyl ether | 25 parts |
|---|---|
| Trimethoxyvinylsilane | 10 parts |
| Vinyl butyrate | 15 parts |
| $CH_2=CHOC_3H_6C_6F_{13}$ | 5 parts |

After removing air from the interior of the autoclave by replacement by nitrogen and cooling the charge to a solid state, 45 parts of $CF_2=CFCl$ was introduced into the autoclave, followed by the same procedure as in Preparation Example 1 to obtain a solution of resin (A-3) having a nonvolatile content of 50%.

PREPARATION EXAMPLE 4

Preparation of Copolymer (A-4)

Xylene (1,000 parts) was placed into a 4000-ml four-necked flask equipped with a stirrer and heated to 120° C. The following mixture of compounds in the proportions given was then added dropwise to the xylene over a period of about 3 hours.

| Styrene | 150 parts |
|---|---|
| n-Butyl methacrylate | 250 parts |
| Hydroxybutyl acrylate | 250 parts |
| γ-Methacryloxypropyltrimethoxysilane | 150 parts |
| $CH_2=CHCOOC_2H_4C_8F_{17}$ | 200 parts |
| Azobisdimethylvaleronitrile | 70 parts |

Azobisdimethylvaleronitrile (10 parts) was thereafter added to the reaction mixture, followed by a further reaction at the same temperature of 120° C. for 2 hours to give a solution of resin (A-4) having a nonvolatile content of 50%.

PREPARATION EXAMPLE 5

Preparation of Copolymer (A-5)

The following mixture was reacted in the same manner as in Preparation Example 4 to obtain a solution of resin (A-5) having a nonvolatile content of 50%.

| Styrene | 200 parts |
|---|---|
| n-Butyl acrylate | 200 parts |
| 2-Ethylhexyl methacrylate | 100 parts |
| Hydroxybutyl acrylate | 100 parts |
| γ-Methacryloxypropyltrimethoxysilane | 300 parts |
| $CH_2=CHCOOC_2H_4C_8F_{17}$ | 100 parts |
| Azobisdimethylvaleronitrile | 70 parts |

COMPARATIVE PREPARATION EXAMPLE 1

Preparation of Copolymer (A-6)

The following mixture was reacted in the same manner as in Preparation Example 4 to obtain a solution of resin (A-6) having a nonvolatile content of 50%.

| Styrene | 150 parts |
|---|---|
| n-Butyl methacrylate | 200 parts |
| 2-Ethylhexyl methacrylate | 350 parts |
| Hydroxyethyl acrylate | 300 parts |
| Azobisdimethylvaleronitrile | 70 parts |

COMPARATIVE PREPARATION EXAMPLE 2

Preparation of Copolymer (A-7)

The following mixture was reacted in the same manner as in Preparation Example 4 to obtain a solution of resin (A-7) having a nonvolatile content of 50%.

| Styrene | 150 parts |
|---|---|
| n-Butyl methacrylate | 200 parts |
| 2-Ethylhexyl methacrylate | 350 parts |
| Hydroxyethyl acrylate | 200 parts |
| γ-Methacryloxypropyltrimethoxysilane | 100 parts |
| Azobisdimethylvaleronitrile | 70 parts |

EXAMPLES 1-9 AND COMPARATIVE EXAMPLES 1-5

Automotive top coating compositions were prepared using the copolymer (A) obtained in the foregoing preparation examples. The top coating compositions were solid color (white) coating compositions and two-coat one-bake clear coating compositions. Table 1 shows the clear coating compositions prepared in Examples 1-7 and Comparative Examples 1-3, and the solid color (white) coating compositions prepared in Examples 8 and 9 and Comparative Examples 4 and 5. The numerical values listed are each the amount of ingredient used, as expressed in parts by weight.

The following ingredients were used.

(1) Melamine resins

Cymel 1303: fully methoxylated melamine resin manufactured by Mitsui-Cyanamid, Ltd.

U-VAN 20SE (60%): butylated melamine manufactured by Mitsui Toatsu Chemicals, Inc.

(2) Acid catalyst

Nacure 5225: dodecylbenzenesulfonic acid as neutralized with dimethyloxazolidine, manufactured by King Industries Inc.

(3) Surface conditioner

BYK 300 solution: product of BYK-Chemie GmbH.

(4) Ultraviolet absorber

Tinuvin 900: product of Ciba-Geigy Corp.

(5) Titanium white

JR-701: titanium dioxide manufactured by Tayca Corporation

Titanium white was dispersed in the copolymer using a paint shaker for 1 hour. For the solid color coating composition, the pigment was used in an amount of 80 parts per 100 parts of resin solids.

results obtained for testing the clear coating compositions for storage stability.

(2) Solid color coating compositions

Each of the solid color coating compositions of Examples 8, 9 and Comparative Examples 4, 5 was applied (to a thickness of 40 μm when cured) to a steel sheet treated with zinc phosphate and formed with an electrodeposition coating and an intercoat in the same manner as above, and was heated at 140° C. for 30 minutes for curing.

Table 2 shows the results obtained by testing the resulting coatings for properties and testing the solid color coating compositions for storage stability.

The test methods are as follows.

(1) Gloss

Measured at a reflection angle of 60 deg. according to JIS K-5400.

(2) Pencil hardness

The coating surface was scratched with leads of pencils (Mitsubishi Uni) under pressure to determine the lead of highest hardness which caused no defacement. The hardness is expressed by a symbol representing the highest hardness.

(3) Distinctness-of-image gloss

TABLE 1

|  | Example | | | | | | | | | Comparative Example | | | | |
| --- | --- | --- | --- | --- | --- | --- | --- | --- | --- | --- | --- | --- | --- | --- |
|  | 1 | 2 | 3 | 4 | 5 | 7 | 8 | 9 | 1 | 2 | 3 | 4 | 5 |
| Copolymer (A) | A-1 | A-2 | A-3 | A-3 | A-4 | A-4 | A-5 | A-1 | A-4 | A-6 | A-6 | A-7 | A-6 | A-7 |
|  | 70 | 80 | 80 | 60 | 80 | 70 | 90 | 70 | 70 | 70 | 70 | 80 | 70 | 70 |
| Cymel 303 | 30 | 20 | 20 | — | 20 | — | 10 | 30 | — | 30 | — | 20 | — | 30 |
| U-VAN 20SE | — | — | — | 40 | — | 30 | — | — | 30 | — | 30 | — | 30 | — |
| Nacure 5225 | 2.0 | 2.0 | 2.0 | 2.0 | 2.0 | 2.0 | 2.0 | 2.0 | 2.0 | 2.0 | 2.0 | 2.0 | 2.0 | 2.0 |
| BYK 300 | 0.1 | 0.1 | 0.1 | 0.1 | 0.1 | 0.1 | 0.1 | 0.1 | 0.1 | 0.1 | 0.1 | 0.1 | 0.1 | 0.1 |
| Tinuvin 900 | 1.0 | 1.0 | 1.0 | 1.0 | 1.0 | 1.0 | 1.0 | 1.0 | 1.0 | 1.0 | 1.0 | 1.0 | 1.0 | 1.0 |
| JR-701 | — | — | — | — | — | — | — | 80 | 80 | — | — | — | 80 | 80 |

The coating compositions prepared in Examples and Comparative Examples were tested for properties in the following manner.

(1) Clear coating compositions

On a mild steel sheet treated with zinc phosphate were formed an electrodeposition coating and an intercoat, to which the following metallic coating composition was applied (to a thickness of 20 μm when cured) and allowed to stand at room temperature for 5 minutes. Each of the clear coating compositions of Examples 1–7 and Comparative Examples 1–3 was then applied to the metallic coating (to a thickness of 40 μm when cured) and heated at 140° C. for 30 minutes to cure both the coatings

| Metallic coating composition | |
| --- | --- |
| Acrylic resin | 100 parts |
| (Acrylic 47-712 manufactured by | |
| Dainippon Ink & Chemicals, Inc.) | |
| Butylated melamine | 60 parts |
| (U-VAN 20SE-60 manufactured by | |
| Mitsui Toatsu Chemicals, Inc.) | |
| Aluminum paste | 10 parts |
| (Alumipaste 55-519 manufactured by | |
| Toyo Aluminum K.K.) | |

A mixture of the above ingredients was adjusted to 14 sec (Ford cup No. 4, 20° C.) using a solvent mixture of 30 parts of Swasol #1000 (aromatic solvent manufactured by Maruzen Petrochemical Co., Ltd.) and 70 parts of toluene.

The resulting coatings were tested for properties with the results shown in Table 1, which also shows the The coating was checked for ICM value (the numerical value listed) by an image clarity meter (product of Suga Shikenki Co., Ltd.). ICM values are in the range of 0 to 100%, and the higher the value, the better is the distinctness-of-image gloss. ICM values not smaller than 80 indicate an excellent gloss.

(4) Impact resistance

A Du Pont impact tester (impact rod having a tip of ½ inch in radius, weight 0.5 kg) was used to determine the resistance in terms of a maximum distance (cm) of fall of the weight which caused no cracking in the coating.

(5) Acid resistance

The test panel was immersed in 40% aqueous solution of $H_2SO_4$ at 40° C. for 5 hours, then withdrawn from the solution, washed with water and checked for the state of the coating. The result was evaluated according to the following four criteria.

A: No change
B: Slight dulling
C: Noticeable dulling
D: Marked dulling, corrosion and like changes (6) Scratch resistance Determined with use of a rubbing tester for dyed articles (product of Daiei Kagakuseiki Seisakusho). A polishing powder (cleanser) was kneaded with water into a solid layer, which was then placed over the coating. The coating was rubbed reciprocatingly 20 times with the testing member placed on the layer under a load of 500 g. The coating was thereafter washed with water and checked for scratches. The result was evaluated according to the following four criteria.
A: No change
B: Slight dulling
C: Noticeable dulling
D: Marked dulling (7) Water resistance The test panel was immersed in a constant-temperature water bath at 40° C. for 240 hours, then withdrawn and checked for changes. The result was evaluated according to the following criteria.
A: Free from dulling, blistering or like changes
B: Dulling or blistering
C: Marked dulling or blistering (8) Resistance to staining A one-gram quantity of staining dust (JIS type 15) was placed on the test panel (5×5 cm), then uniformly spread over the coated surface by 20 strokes of brushing and thereafter allowed to stand at 20° C. for 24 hours. Subsequently, the panel was cleaned in running water using a clean brush and checked for stains according to the following criteria.
A: No stain
B: Slightly stained
C: Noticeably stained and unacceptable
D: Markedly stained (9) Water repellency (initial)

Expressed in terms of a numerical value obtained by measuring the contact angle of water on the coating surface using a contact angle meter (product of Kyowa Kagaku Co., Ltd.). The contact angle was measured three minutes after a drop of distilled water (0.03 ml) was placed on the coating (at a temperature of 20° C.). The greater the value, the greater is the water repellency of the coating.

(10) Water repellency retentivity

Expressed in terms of the retentivity (%) of the contact angle of water on the test panel, as determined after subjecting the panel to the QUV accelerated weather test (to be described below) for 1968 hours (82 cycles).

(11) Weather resistance

Determined by a QUV accelerated weather test using a QUV accelerated weather tester, product of The Q Panel Co., Ltd. The coating was irradiated with UV rays at 60° C. for 16 hours by a UV lamp (FS.40, product of Westinghouse Electric Corp.), 313 nm in maximum wavelength, and then exposed to condensation water at 50° C. for 8 hours as one cycle. After repeating this cycle for 3,000 hours (125 cycles), the coating was evaluated according to the following criteria.
A: Almost remaining unchanged in gloss
B: Slight reduction in gloss but free from cracks or chalking
C: Marked reduction in gloss along with cracking or chalking, hence unacceptable

(12) Storage stability

The coating composition as diluted to a specified viscosity (Ford cup No. 4, 22 sec) was preserved in a closed container at 40° C. for 1 week while thereby being held out of contact with the outside air, and then evaluated according to the following criteria.
A: Less than 5 sec in the rise of viscosity
B: 5 to 10 sec in the rise of viscosity
C: Gelation

TABLE 2

| Coating composition | Example |  |  |  |  |  |  |  |  | Comparative Example |  |  |  |  |
|---|---|---|---|---|---|---|---|---|---|---|---|---|---|---|
|  | 1 | 2 | 3 | 4 | 5 | 6 | 7 | 8 | 9 | 1 | 2 | 3 | 4 | 5 |
| Gloss | 96 | 95 | 95 | 97 | 96 | 96 | 97 | 91 | 93 | 98 | 97 | 96 | 99 | 99 |
| Pencil hardness | F | F | F | H | F | F | F | H | H | F | F | F | H | H |
| Distinctness-of-image gloss | 94 | 93 | 93 | 92 | 92 | 93 | 94 | 93 | 92 | 93 | 92 | 91 | 91 | 91 |
| Impact resistance | 40 | 45 | 45 | 30 | 45 | 40 | 50 | 40 | 45 | 40 | 40 | 45 | 40 | 45 |
| Acid resistance | A | A | A | A | A | B | A | A | B | C | D | C | D | C |
| Scratch resistance | A | A | A | A | A | B | B | A | B | C | C | C | C | C |
| Water resistance | A | A | A | A | A | B | A | A | B | B | B | B | B | B |
| Resistance to staining | A | B | A | B | B | B | A | A | B | C | C | C | C | C |
| Water repellency (initial) | 87 | 88 | 99 | 98 | 96 | 95 | 97 | 88 | 96 | 79 | 78 | 78 | 78 | 79 |
| Water repellency retentivity (%) | 75 | 76 | 78 | 79 | 79 | 77 | 78 | 76 | 77 | 45 | 44 | 42 | 43 | 40 |
| Weather resistance | A | A | A | A | A | A | A | A | A | B | B | B | B | B |
| Storage stability | A | A | A | A | A | A | A | A | A | A | A | A | A | A |

We claim:

1. An organic solvent-based coating composition consisting essentially of:
(A) a copolymer comprising (i) 5 to 40 wt. % of an alkoxysilane-containing vinyl monomer which is a compound represented by the formula

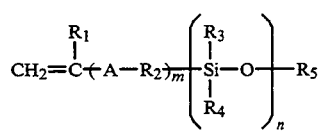

wherein A is

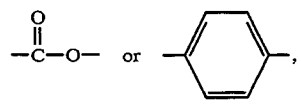

R₁ is a hydrogen atom or methyl group, R₂ is a bivalent aliphatic saturated hydrocarbon group having 1 to 6 carbon atoms, R₃ and R₄ are the same or different and are each a phenyl group, alkyl group having 1 to 6 carbon atoms or alkoxy group having 1 to 10 carbon atoms, R₅ is an alkyl group having 1 to 10 carbon atoms, m is 0 or 1, and n is an integer of 1 to 100, (ii) 5 to 50 wt. % of a hydroxyl-containing vinyl monomer and (iii) 30 to 70 wt. % of a fluorine-containing vinyl monomer,
(B) an amino resin in an amount of 5 to 50 wt. % based on the total amount of solids in the copolymer (A) and the amino resin (B), and
(C) an organic solvent.

2. A composition as defined in claim 1 which is an automotive top coating composition.

3. A composition as defined in claim 1 wherein the copolymer (A) is about 3,000 to about 500,000 in number average molecular weight.

4. A composition as defined in claim 1 wherein the amino resin (B) is a melamine resin.

5. An organic solvent-based coating composition consisting essentially of:

(A) a copolymer comprising (i) 5 to 40 wt. % of an alkoxysilane-containing vinyl monomer which is a compound represented by the formula

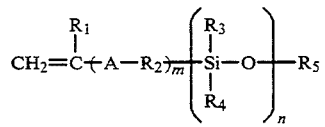 (I)

wherein A is

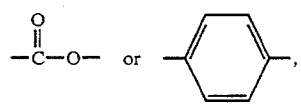

$R_1$ is a hydrogen atom or methyl group, $R_2$ is a bivalent aliphatic saturated hydrocarbon group having 1 to 6 carbon atoms, $R_3$ and $R_4$ are the same or different and are each a phenyl group, alkyl group having 1 to 6 carbon atoms or alkoxy group having 1 to 10 carbon atoms, $R_5$ is an alkyl group having 1 to 10 carbon atoms, m is 0 or 1, and n is an integer of 1 to 100, (ii) 5 to 50 wt. % of a hydroxyl-containing vinyl monomer and (iii) 30 to 70 wt. % of a fluorine-containing vinyl monomer, (B) an amino resin in an amount of 5 to 50 wt. % based on the total amount of solids in the copolymer (A) and the amino resin (B)

(C) an organic solvent, and (D) a curing catalyst.

6. A composition as defined in claim 5 which is an automotive top coating composition.

7. A composition as defined in claim 5 wherein the copolymer (A) is about 3,000 to about 500,000 in number average molecular weight.

8. A composition as defined in claim 5 wherein the amino resin (B) is a melamine resin.

* * * * *

UNITED STATES PATENT AND TRADEMARK OFFICE
CERTIFICATE OF CORRECTION

PATENT NO.  :  5,449,717
DATED       :  September 12, 1995
INVENTOR(S) :  YOKOYAMA et al.

It is certified that error appears in the above-identified patent and that said Letters Patent is hereby corrected as shown below:

On the front page, Item [75], the second inventor's name "Mitsuhior Fukuda" should read --Mitsuhiro Fukuda--.

Signed and Sealed this

Twenty-third Day of January, 1996

Attest:

BRUCE LEHMAN

Attesting Officer      Commissioner of Patents and Trademarks